United States Patent [19]

Phillips et al.

[11] 3,798,591

[45] Mar. 19, 1974

[54] ACCESS CIRCUIT FOR A TIME-SHARED DATA PROCESSING EQUIPMENT

[75] Inventors: Brian Harry Phillips, Rugby; Peter Carrington, Conventry, both of England

[73] Assignee: The General Electric Company Limited, London, England

[22] Filed: Sept. 28, 1971

[21] Appl. No.: 184,515

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,333,252 | 7/1967 | Shimabukuro | 340/172.5 |
| 3,460,043 | 8/1969 | Hsieh | 340/172.5 X |
| 3,599,162 | 8/1971 | Byrns | 340/172.5 |
| 3,676,861 | 7/1972 | Ruth | 340/172.5 |
| 3,251,040 | 5/1966 | Burkholder et al. | 340/172.5 |
| 3,665,415 | 5/1972 | Beard et al. | 340/172.5 |
| 3,399,384 | 8/1968 | Crockett et al. | 340/172.5 |
| 3,447,135 | 5/1969 | Calta et al. | 340/172.5 |
| 3,478,321 | 11/1969 | Cooper et al. | 340/172.5 |

*Primary Examiner*—Harvey E. Springborn
*Attorney, Agent, or Firm*—Kirschstein, Kirschstein, Ottinger & Frank

[57] ABSTRACT

A multiple access circuit for a stored-program-control signalling system and giving access, for example, to a common data store from a number of processing units in such manner that only one processing unit obtains access at a time and additionally so that if two or more other processing units are queueing for access a priority arrangement allots access to a particular one of the waiting units when the data store becomes available. The priority allotment may be fixed or variable.

4 Claims, 6 Drawing Figures

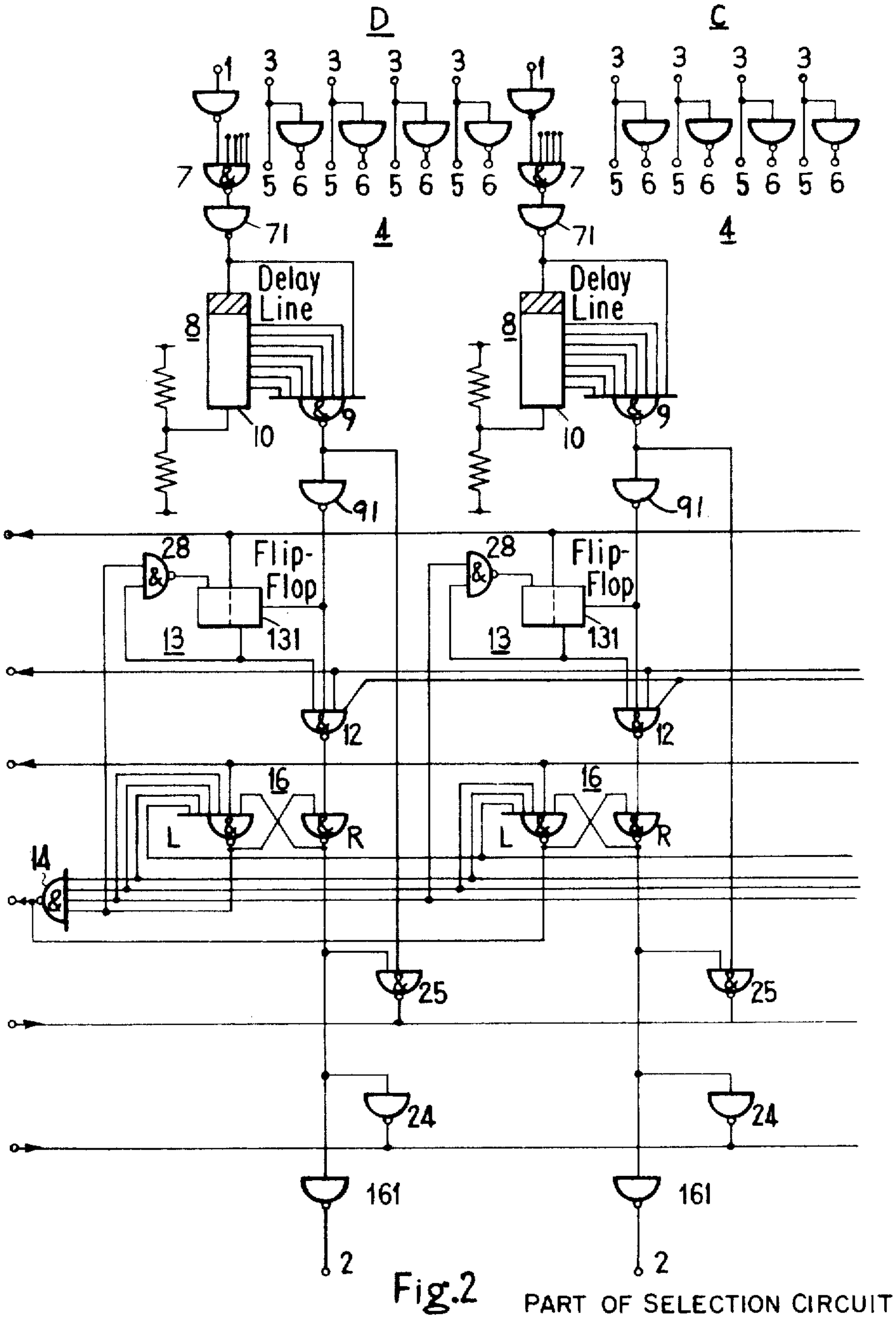
Fig.2 PART OF SELECTION CIRCUIT

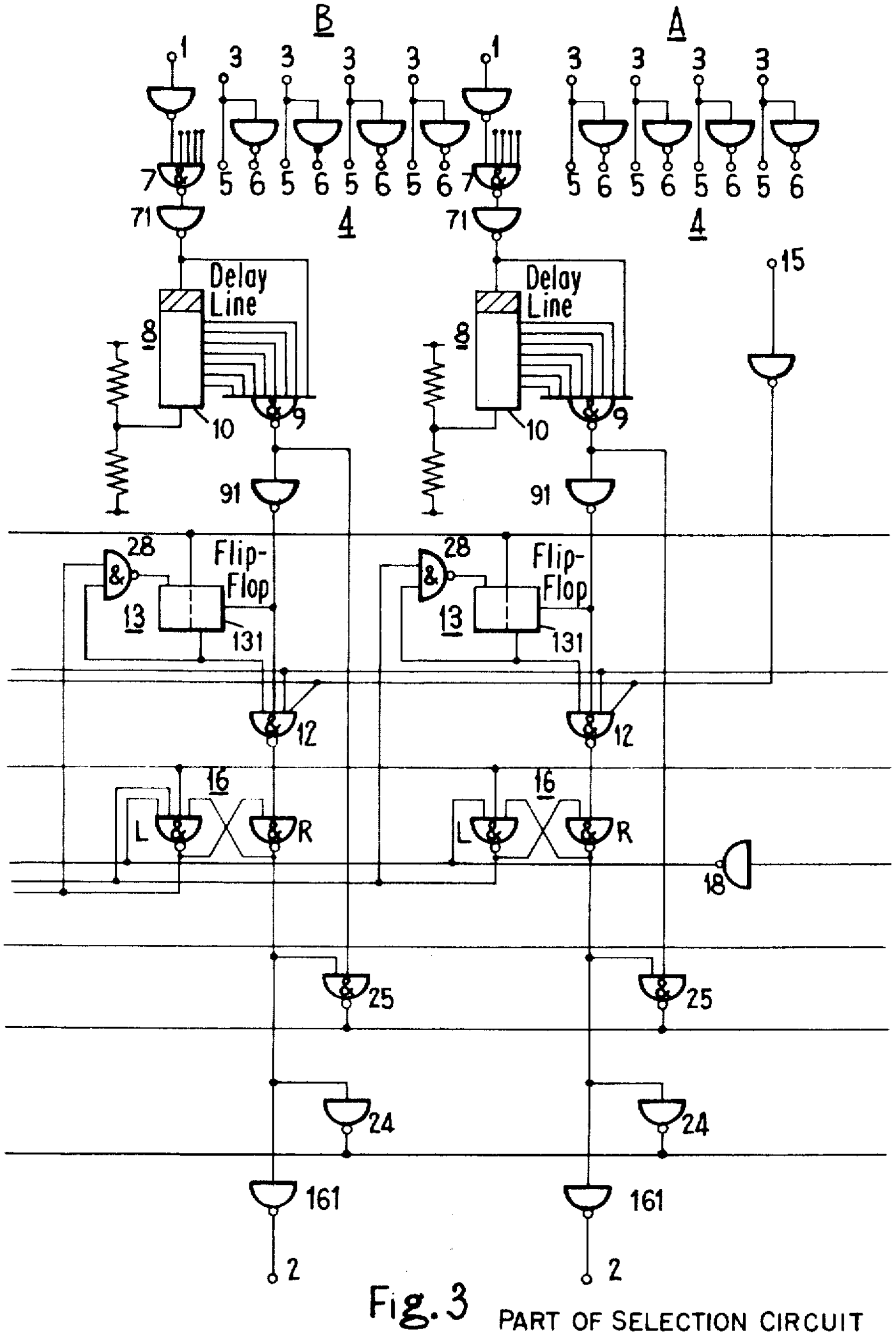
Fig. 3 PART OF SELECTION CIRCUIT

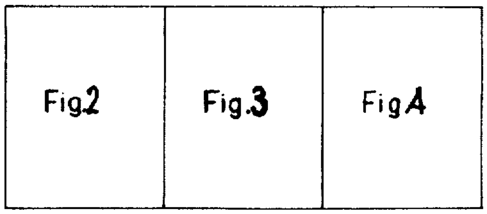
Fig. 5
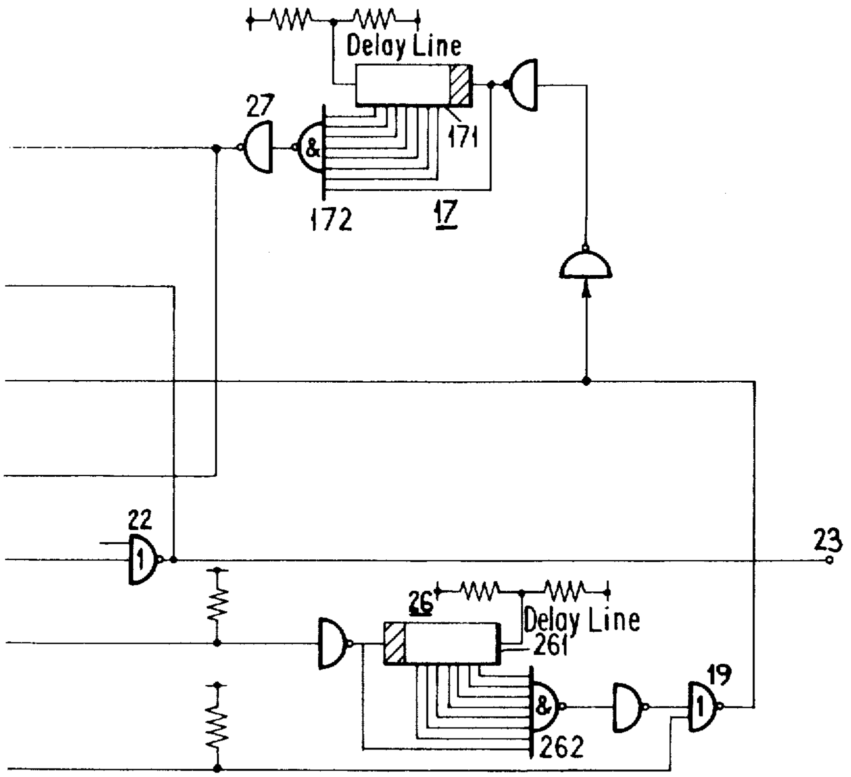
Fig. 4 PART OF SELECTION CIRCUIT

ACCESS CIRCUIT FOR A TIME-SHARED DATA PROCESSING EQUIPMENT

BACKGROUND AND SUMMARY OF THE INVENTION

This invention relates to selecting circuits and in particular to such circuits which select one from a number of signals which may arise at unrelated times and are required not to interfere with each other.

A particular example of the use of such a circuit occurs in a stored-program-control signalling system that has been proposed. In this system certain equipment is accessed by a plurality of other equipments on a random time basis. One object of the present invention is to provide a circuit which can be employed to facilitate the selection of these equipments one at a time when their requests for access coincide.

Another object of the invention is to provide a circuit which permits selection of these equipments on a priority basis. A further object of the invention is to provide such a circuit in which the priority basis is variable.

According to a first aspect, the present invention provides a selecting circuit comprising a plurality of input terminals for application of respective request signals to the circuit. The circuit also has a plurality of storage circuits, each having an first condition and a second condition, connected to the input terminals by way of respective gates. When a request signal is applied to one of the input terminals, it triggers a respective storage circuit into its second condition. This in turn causes a disabling signal to be applied to all the gates, thus preventing any further request signal from triggering its respective storage circuit. When the request signal is withdrawn, the second condition of the respective storage circuit is removed.

The selecting circuit preferably has means responsive to a second condition of any of said storage circuits, for inhibiting all storage circuits of lower priority.

According to a second aspect, the present invention provides a selecting circuit comprising a plurality of input terminals for application of respective request signals to the circuit, and a priority register for holding data allotting a current order of priority to the terminals. If a plurality of request signals are present, the circuit selects the one that is applied to the input terminal of highest current priority.

BRIEF DESCRIPTION OF THE DRAWINGS

Two examples of selection circuits in accordance with the invention will now be described, by way of example, with reference to the accompanying drawings of which:

FIGS. 2, 3 and 4 when assembled as indicated in FIG. 5 form a detailed circuit diagram of said selection circuit.

DESCRIPTION OF THE PREFERRED EMBODIMENT

Figure 1:
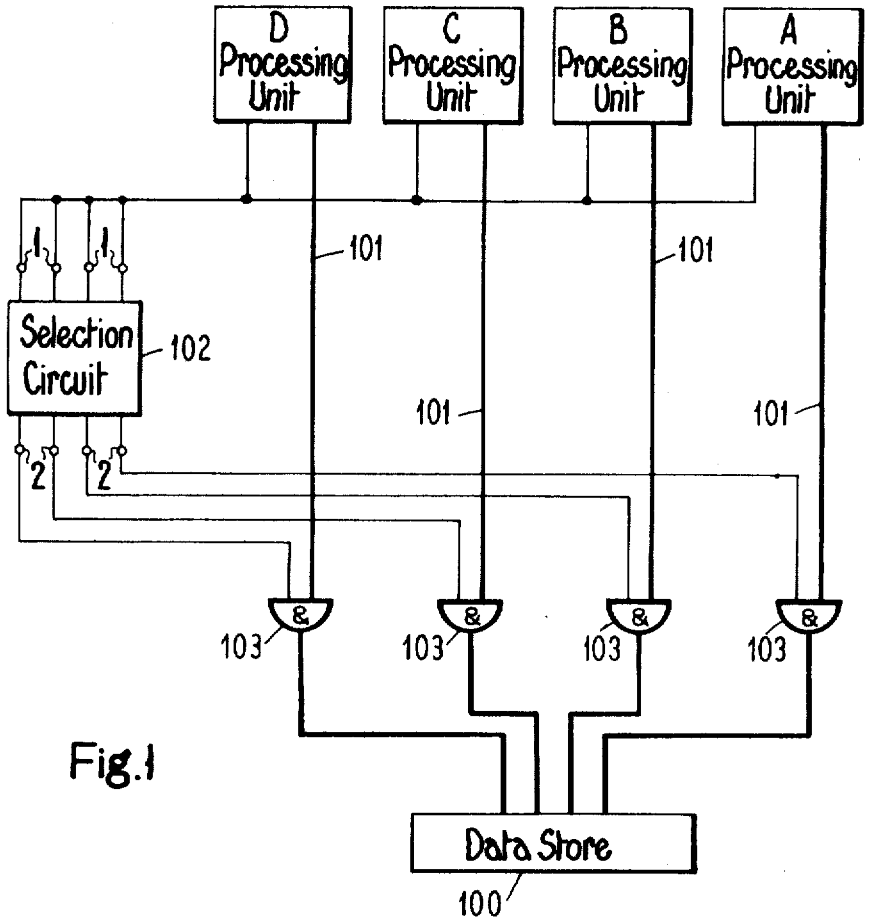
FIG. 1 is a schematic diagram of part of a stored program control signalling system showing how the selection circuit of the invention fits in to the system.

In a particular stored program control signalling system in which the present circuits may be employed, processing units A, B, C and D as shown in FIG. 1, and perhaps drum stores (not shown), require access to a number of data storage blocks 100 one of which is shown in FIG. 1. The paths 101 from the processing units to the data stores are multi-path highways to which other data store units (not shown) may be connected. FIG. 1 illustrates diagrammatically how the multi-path highways are controlled by a selection circuit 102 in response to requests from the processing units. For a particular storage block 100 the four units A, B, C and D may be required to have access according to a predetermined or continuously varying priority basis. In this latter case the waiting times for the different processing units may be balanced. In such a system each storage block is provided with a selection circuit such as shown in the drawings and the processing units are allotted the references A, B, C and D in descending order of priority.

Referring to FIGS. 2, 3, 4 and 5 of the drawings, the circuit has four similar sections which accommodate the four 'requesting' units A, B, C and D. These references will be used as suffixes to distinguish similar items in the different sections. It is clear from the progression of the circuitry how a greater or smaller number can be accommodated. When one of the four units A, B, C or D requires access to the shared data store block a request signal is applied to an input terminal 1 allotted to the particular equipment. Also allotted to the units A, B, C and D are four output terminals 2. If a number of request signals are applied to the terminals 1 a request signal is required to appear on only one of the terminals 2 and that on the terminal 2 associated with the highest priority one of the equipments A, B, C and D requesting access. The result of a request signal appearing on a terminal 2 is that a switched connection is made between the associated processing unit and the shared data store block.

The four processing units are connected to the selection circuit by a four-wire address highway which interconnects terminals 3 of decoders 4 associated with the four sections. Each of the units A, B, C and D has its own binary address which it transmits on the address highway. Each decoder 4 supplies either normal or inverted versions of the respective four highway signals to four inputs of a NAND gate 7. Each input is strapped to a terminal 5 or a terminal 6 according to the address to be accepted by the decoder. The strapping is not shown.

A further input to the NAND gate 7 is derived from the input terminal 1 by way of an inverting gate. When a unit is required to access the storage block a request signal is transmitted to the associated input terminal 1. Both request signal and unit address are required to initiate the request and there is therefore some redundancy here for security purposes.

The output of the NAND gate 7 is applied to a tapped delay line 10 after inversion in a gate 71. Each tapping of the delay line 10 is applied to a respective input of a NAND gate 9 which is therefore enabled only when the input signal has persisted for a period corresponding to the extent of the tappings. The components 9, 10 thus constitute a persistence timing circuit indicated generally by the reference numeral 8.

Following the NAND gate 9 and an inverting gate 91 is a four input NAND gate 12. A first input of this gate 12 derives a signal from a fault detection circuit 13. The second input is derived from the gate 9, by way of the gate 91, the third input, which is common to all four gates 12, is derived from a gate 14, by way of gate 22 (FIG. 4), which provides an indication of a request having been presented and selected, and the fourth input, also common to all four gates 12, is derived from a terminal 15 which, in use, is connected to the storage block 100 to receive an indication that the storage block required is performing its cycle of reading and writing, that is, is busy.

Following the gate 12 is a storage circuit 16 consisting of two cross-coupled NAND gates 16L and 16R. One input of each of them is connected to the output of the other so that when either gate is enabled (having a '0' output) the other gate is disabled. Thus, the storage circuit 16 has two stable conditions: a first condition in which the gate 16L is disabled and gate 16R is enabled, and a second condition in which these gates are enabled and disabled respectively. The main input of the gate 16R is derived from the output of gate 12. If the storage circuit 16 is initially in its first condition, a 0 on the main input of 16R, causes gate 16L to trigger the storage circuit into its second condition. It will then remain in that condition even when the triggering 0 from gate 12 reverts to a '1'.

The four gates 16L receive a common inhibiting signal from a timing circuit 17 (FIG. 4) in a fault condition, this signal being applied by way of an inverting gate 27 and a NOR gate 18.

A second input of each gate 16L receives an inhibiting signal in common from a NOR gate 19 when any request signal has been selected.

In this particular example, the output of each gate 16L is applied to an input of each other gate 16L of lower priority, thus the output of gate 16LA is applied to an input of all other gates 16LB, 16LC and 16LD. The output of gate 16LB is applied to an input of gates 16LC and 16LD, and so on.

In addition to being fed back to lower priority circuits 16, the outputs of all the gates 16L are applied to the NAND gate 14 previously referred to. This gate 14 is thus enabled, producing a 0 output, when all of the storage circuits 16 are in their first condition. If any storage circuit 16 is in its second condition the gate 14 is disabled and a 1 signal supplied, after inversion to a 0 by the NOR gate 22, as an inhibiting signal to the third input of each of the gates 12, as previously mentioned. (The other input of the gate 22 would accommodate extension of the circuitry to eight possible requesting circuits by duplication of the circuitry shown.) In addition to this lock-out effect a signal (0) is applied to a terminal 23 from the gate 22 and in use this terminal is connected to the storage block 100 (FIG. 1) so as to initiate the storage block cycle. Thus the selected terminal 2 determines which of the four signal highways is connected to the storage block and a signal applied to terminal 23 initiates the transfer of data between the selected highway and the storage block.

A lock-out signal arises from the storage block on the initiation of data read-out and is applied as a 1 to terminal 15. This ensures that gates 12 are disabled to other inputs in the event that the requesting signal ceases before the read-out is complete causing premature reset of the storage circuit 16 and removal of the normal inhibiting signal.

The output of each gate 16R is applied to the associated output terminal 2 via inverting gates 161, and, in addition, to two gates 24 and 25. The outputs of gates 25 are in wired-OR connection to a common-timing circuit 26 comprising a tapped delay line 261 and a NAND gate 262, connected in a similar manner to the components 9, 10 of the timing circuit 8, and the outputs of gates 24 in similar connection to the NOR gate 19 previously mentioned. (The wired -OR connection facilitates extension of the circuit as mentioned above). The second condition of any storage circuit 16, appearing as a 1 at the output of gate 16R, and indicative of a request signal present and selected is also applied to the timing circuit 17 comprising a tapped delay line 171 and a NAND gate 172 (similar to the circuit 8) to initiate a timing of the duration of the request signal.

The gate 25 receives one input signal from the storage circuit 16 and another from the timing circuit 8. The signal inversions in the circuit are such that the gate 25 a (NAND gate) is enabled, to produce an output 0, when the storage circuit 16 still indicates a request present and the timing circuit 8 has run-out on cessation of the request signal applied to terminal 1.

The storage block in question issues a proceed signal when the 'write' half of the cycle is complete. The request signal applied to terminal 1 from the processing unit should then be removed by the unit. When the request signal is so removed, the gate 25 is enabled thus initiating the timing circuit 26. After the time lapse of this circuit, a 1 signal is applied to gate 19 and an inhibiting 0 signal to timing circuit 17 and to every gate 16L. Circuit 17 is arranged to have a time lapse that exceeds the duration of a storage block cycle plus the time lapse of circuit 26 so that in general, in the absence of any fault, there will arise no 1 fault output from gate 27.

If the request signal persisted beyond the duration of timing circuit 17, the selected storage circuit 16 would be reset, by way of gate 18, by the fault output of gate 27. This would, but for the fault detection circuit 13 to be described, result in the enabling of gate 12 and the re-latching of the same storage circuit 16. As will be seen, this would result in non-availability of the storage block, for the duration of the fault condition, to any lower priority requests. However, fault detection circuit 13 avoids this problem as follows. The fault detection circuit 13 comprises a standard d-type bistable (flip-flop) circuit 131 having an overriding 'clear ' input a clock input a triggered input and an output other connections to this standard circuit not being used. The triggered input is connected to the output of a NAND gate 28 which has one input connected to the output of the associated 16L gate and a second input connected to the output. The clock input is connected to the output of gate 27, and the clear input is connected to the associated input path at such a point that in the absence of a request signal a 0 is applied to it which forces a 1 on the bistable output. In the presence of a request signal, a 1 is applied which gives control of the state to the triggered and clock inputs. The output from the bistable circuit 131 is applied as one input of the associated gate 12 and thus an enabling 1 is applied to this gate prior to the application of a request signal.

In the event of a persistent request signal the clear input will receive a non-determining 1 signal while the output of gate 28 will be a 1 resulting from a 01 input. On the time-lapse of circuit 17 the clock input will be triggered and the bistable will change state to give a 0 output. The storage circuit 16 will revert to its first condition ready to accept the (same) applied request signal again but the gate 12 will now be disabled and will remain so until the request signal is removed from the terminal 1.

In operation, two processing units may apply request signals, at nearly the same time, to say, terminals 1A and 1B. After testing the two signals for sufficient continuity in timing circuits 8A and 8B the signals may then be applied to their respective gates 12 at a time when the required storage block is still in operation and an inhibit signal is applied to all gates 12 by way of terminal 15. When this inhibit signal is removed the two signals will be passed to their respective storage circuits 16 simultaneously as a 0 signal to the gates 16RA and 16RB. These gates will thus be disabled and produce 1's output. The gates 16LA and 16LB are normally disabled, i.e. producing a 1 output, by virtue of their inputs 100 and 1100 respectively. The disabling of gates 16RA and 16RB causes their 1 outputs to be applied directly to the gates 16LA and 16LB and also causes a 1 to be applied to all the gates 16L by way of gates 24A, 24B and 19. Gates 16LA and 16LB are thus enabled and their outputs change to 0 thus confirming the disabling of gates 16RA and 16RB which then have 00 inputs. However, directly the left hand gates are enabled, the 0 output of gate 16LA is applied to the inputs of all the other left-hand gates 16L and particularly to gate 16LB. This gate is then immediately disabled again and its output reverts to 1 so partly enabling gate 16RB again. Meanwhile the 0 output of gate 16LA disables gate 14 thus causing, by way of gate 22, a 0 to be applied to all of the gates 12. No further change in the storage circuits 16 is then possible by way of the input paths through gates 12.

Gate 16RB is then back to its original state, fully enabled, with 11 input and a 0 output. Gate 16RA is, however, still disabled and latched by its cross-coupled 0 and maintains its 1 output. This 1 results in a 0 signal at terminal 2A only, of the terminals 2.

This 0 signal will then remain until circuit 16A is unlatched by the disablement of gate 16RA on the cessation of the request signal as detected by gate 25 or by a fault signal arising on the lapse of the timed period of circuit 17.

As described previously, such a fault signal will lock out the storage circuit 16A by disabling the gate 12A. The circuit 16A cannot then hold the storage block equipment unavailable to the other, lower priority paths.

The presence of the 0 signal on terminal 2A causes the A processing unit to be provided with a multi-path connection to the storage block 100 by way of a gate 103 as illustrated in FIG. 1. The (0) signal arising at terminal 23, when gate 14 indicates the selection of a storage circuit, initiates the transfer of data between the selected processing unit and the storage block.

When the storage block cycle is half-completed a 'proceed' signal removes the inhibiting 1 from terminal 15 and removes the request signal which is presented to terminal 1A by the processing unit A.

Figure 6:
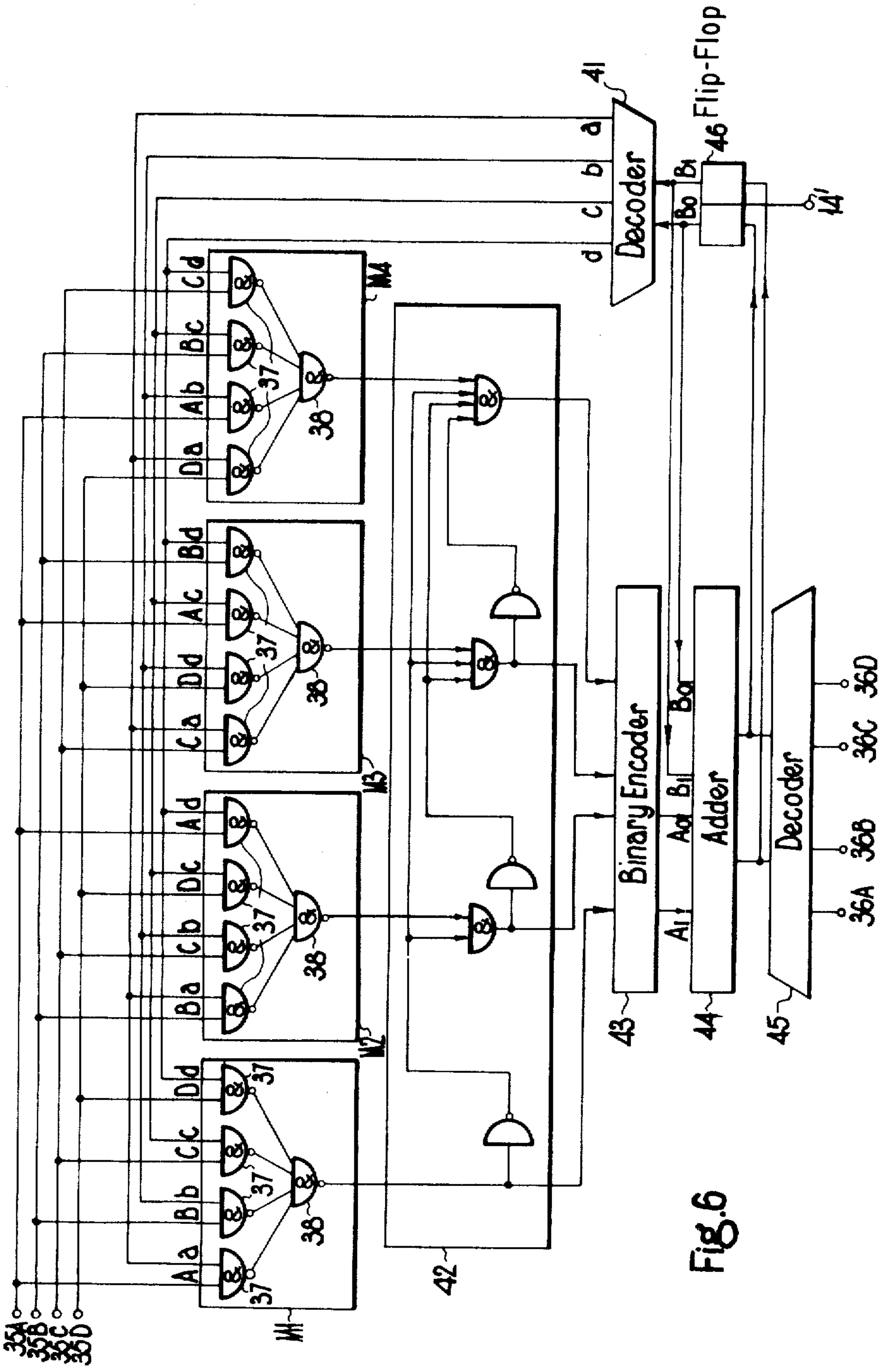
FIG. 6 is a circuit diagram of part of a second selection circuit shown as a modification of FIGS. 2, 3 and 4.

Referring now to FIG. 6, this illustrates a modification of the circuit of FIGS. 2, 3 and 4 to provide a variable priority facility in contrast to the 'wired-in' priority of the above circuit.

In the circuit of FIGS. 2, 3 and 4 the priority order is provided by the connections from the output of each gate 16L to the input of each gate 16L of lower priority in the chosen priority order. In the modification of FIG. 6 no such wired-in priority is provided. FIGS. 2, 3 and 4 are adapted for the modification of FIG. 6 as follows. The wired-in priority connections are removed from the storage circuits 16: thus both left and right hand gates 16L and 16R have only one input apart from the cross connection. Next the NAND gates 12 are changed to AND gates for convenience in operation of the circuit of FIG. 6. The outputs from the (now) AND gates 12 are disconnected from the gates 16R and applied instead to the respective input terminals 35A, B, C and D of FIG. 6. These input terminals 35 have the section reference attached for convenience in relating them to FIGS. 2, 3 and 4 but, in fact, the references A, B, C and D have no significance here as the priority order is not fixed.

The disconnected inputs to the gates 16R are then connected to the output terminals 36 of FIG. 6.

In the circumstances described above, where a request is in progress, several other requests accumulate at the inputs to their respective gates 12, and then the existing request drops off, the several request signals are applied simultaneously to the terminals 35 of FIG. 6.

The function of the circuit of FIG. 6 is to take all of the input paths from terminals 35, arrange them in a current order of priority, which is registered, allow the highest priority one of any request signals present to emerge, and by processing the number (in the priority order) of the emergent request signal with a number representative of the priority order, to obtain an output indicating a particular one of the output terminals 36A, B, C or D.

The order of the four paths from terminals 35 is rearranged as follows. Four multiplex gating circuits M1, M2, M3 and M4 each comprise four NAND gates 37 and a further NAND gate 38 which provides an OR function for the outputs of the gates 37. The four input paths from the terminals 35 are applied to the four multiplex units but in four different orders, thus ABCD, BCDA, CDAB, and DABC. The order of the multiplex units from left to right is in accordance with the current order of priority. The particular one of the four orders, and thus the current order of priority, is selected by the gates 37 one of which is enabled in each multiplex unit.

The enabling inputs for the gates 37 are derived from a decoder 41 which decodes a two-bit binary word into a one-out-of-four code, one of four output leads *a, b, c* or *d* being marked with a 1 accordingly. Thus with the *a* lead marked the rearranged order of the input paths is A B C D (no change in fact); with the lead *b* marked the rearranged order is B C D A, etc.

Any request signals applied to the terminals 35 will thus appear at the outputs of the multiplex units M1 – M4 but in the current priority order. The original identity of the paths is therefore lost, when considering the multiplex unit outputs only.

A priority gating circuit 42 has four inputs connected to the output of the multiplex units. The priority circuit 42 comprises four paths each of which when enabled disables all other paths to the right of itself. Thus the left hand path is the highest priority. It is this fixed priority circuit which determines the priority order of the multiplex units M1 – M4.

If now, several request signals appear on the terminals 35 they will appear at the outputs of those multiplex units determined by the current priority order, and the highest priority one of these request signals will appear on the appropriate one of the priority circuit outputs. The particular output, counting from the left, indicates the degree of priority that the selected request signal was allotted.

Having selected a particular request signal it now remains to determine its identity out of the original four, A, B, C or D. This is done as follows. The selected output of the priority circuit is encoded as a two-bit binary number $A_1 A_0$ in an encoder 43. This number is added, in a binary adder 44, to the binary number $B_1B_0$ which was decoded to select one of the leads *a, b, c* or *d.* The resulting binary sum is decoded by a decoder 45 to select one of the output terminals 36A, B, C or D by marking it with a 0 (the others remaining at 1).

In addition to decoding the binary sum output of adder 44, the sum is applied to a two-bit register 46, for parallel read-in when clocked by a signal on terminal 14'. This signal is derived from the output of gate 14 in FIG. 2 and arises when the selected storage circuit 16 is triggered into its second condition. Immediately a storage circuit is in its second condition, therefore, the priority order for the next selection is determined by the sum digits clocked into register 46.

It may be noted that the next priority order set is the sum of the existing one $B_1B_0$ and the priority of the currently selected one $A_1A_0$. The register 46 therefore keeps a continuous record of the current priority order and thus serves as a reference in identifying the origin of a selected request signal emerging from the priority circuit 42.

The decoder 41 has a preset coding relation and decodes the binary numbers 0 to 3 as *a, b, c* and *d* respectively. This relationship is of course arbitrary and merely determines the phase of the priority cycle.

The decoding relation of the decoder 45 is predetermined, the binary numbers 01 to 00 giving output signals on the leads A to D respectively.

In a particular example, suppose request signals appear simultaneously on terminals 35B and 35D when the output lead *c* of the decoder 41 is marked with a 1. The third gate (Bc) in multiplex unit M4 will be enabled to pass the request signal from terminal 35B, and the third gate (D*c*) in multiplex unit M2 will be enabled to pass the request signal from terminal 35D. It is noted that the second and fourth request signals have now been rearranged according to the current priority order as the fourth and second signals. The output from M2 will be accepted by the priority circuit 42 in preference to that from M4 and the binary encoder 43 accordingly produces output digits 10 to identify the priority grading of the accepted request signal.

The decoder 41 produced an output *c* and therefore the register content $B_1$ $B_0$ must be 10. The sum produced by the adder 44 is therefore 00 (neglecting the carry from the second digit) which is decoded by the decoder 45 as 4, i.e. input terminal 35D. A 0 is therefore applied by the decoder to storage circuit 16D.

At the same time, the sum output, 00, of adder 44 is applied to register 46 and when the storage circuit 16D is latched, gate 14 in FIG. 2 is disabled and the output change from 0 to 1 is used to clock the register 46. Thus the next priority order is the *a* order, A B C D.

The modification of FIG. 6 provides automatic balancing of the usage of the different processing units by the continuous cycling of the priority order.

In a stored-program-control system it may be desirable to use both priority determining systems. Thus the processing units may obtain access to the high speed electronically accessed store blocks by means of the variable priority facility while drum stores employ the wired-in facility. Drum stores are relatively slow in accessing specified words but relatively fast in the actual transfer of each word. There should therefore, be no unnecessary interference with the drum operation and drum stores are therefore preferably given high priority. This implies a wired-in priority over the processing units so that first access to the store block is given to a drum selected from others by a wired-in priority scheme, and failing a drum request, the processing unit requests are sorted out and selected by means of the variable priority facility.

The following textbooks may be referred to for details of the construction of logic components such as those utilized in the circuits herein described:

a. "Design of Transistorized Circuits for Digital Computers", by A.I. Pressmann, published by J.F. Rider Publisher, Inc. (New York 1959), b. "Pulse and Digital Circuits", by J. Millman and H. Taub, published by McGraw-Hill Book Co., Inc. (New York 1956), Chapter 13, pages 392-428, c. "Introduction to Digital Electronics", By A.W. Lo, published by Addison-Wesley Publishing Co. 1967, Chapter 2, Section 2.3, pages 65–84.

We claim:

1. A selecting circuit comprising:

a. a plurality of input terminals for application of respective request signals to the circuit;

b. a plurality of storage circuits, each having a first condition and a second condition;

c. a plurality of gating means interconnecting respective ones of said input terminals to respective ones of said storage circuits, for feeding request signals applied to said input terminals to the respective storage circuits to thereby cause those storage circuits to be triggered into their second conditions;

d. means responsive to said second condition of any of said storage circuits to disable all said gating means and thereby prevent any further request signal applied to a said input terminal from being fed to its respective storage circuit;

e. timing means connected to all said storage circuits, for initiating a predetermined time period upon setting of any of said storage circuits into a said second condition;

f. means responsive to the cessation of a said request signal at a said input terminal, for normally resetting the respective storage circuit to its said first condition after said predetermined time period;

g. fault detection means connected to said timing means and to said input terminals, for providing a fault signal on the condition that when said predetermined period elapses a said request signal still persists at an input terminal associated with a storage circuit in said second condition;

h. means responsive to said fault signal to reset to its first condition the storage circuit then in it second condition; and i. means for applying said fault signal to the gating means of said associated storage circuit to inhibit that gating means, thereby preventing repeated triggering of that storage circuit if said request signal persists.

2. A circuit according to claim 1 wherein said fault detection means comprises:

a. a plurality of bistable circuits connected respectively to said input terminals, each bistable circuit having a normal condition and a fault condition;

b. means for setting a said bistable circuit to its said normal condition in the absence of a request signal at the respective input terminal; and c. means for setting a said bistable circuit to said fault condition upon coincidence of all of the following three circumstances:

i. said second condition of the associated storage circuit, ii. a request signal applied to the associated input terminal, and iii. elapsing of said predetermined period of said timing means.

3. A selecting circuit comprising:

a. a plurality of input terminals for application of respective request signals to the circuit;

b. priority register means for holding data alloting a current order of priority to said input terminals;

c. a plurality of signal paths having a predetermined order of priority;

d. variable interconnection means, responsive to the data in said priority register, for applying request signals from said input terminals in said current order of priority respectively to said signal paths in said predetermined order of priority;

e. fixed priority circuit means connected to said signal paths for producing an output signal identifying which of said signal paths currently having a request signal applied thereto has the highest priority in said predetermined order of priority as set forth in (c); and f. means for modifying said output signal in accordance with the data in said priority register, to produce an output indication identifying the input terminal that is currently associated with the signal path identified by said output signal.

4. A selecting circuit according to claim 3 further comprising means for periodically varying said data in said priority register, thereby varying said current order of priority allotted to said input terminals.

* * * * *

UNITED STATES PATENT OFFICE
CERTIFICATE OF CORRECTION

Patent No. 3,798,591 Dated March 19, 1974

Inventor(s) Brian Harry Phillips et al.

It is certified that error appears in the above-identified patent and that said Letters Patent are hereby corrected as shown below:

-- Sheet 2, Fig. 2, the output of of NAND gate 16 LC should be applied only to the second lowest input of NAND gate 14, one input of NAND gate 16LD, and one input of NAND gate 28C. The output of NAND gate 14 should be extended to Sheet 4, Fig. 4 and applied to the lower input of NOR gate 22 only. --.

Signed and sealed this 12th day of November 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
U S GOVERNMENT PRINTING OFFICE 869-930